(No Model.)
G. E. WOODBURY.
BELT OR APRON FOR ORE CONCENTRATORS.
No. 434,693.  Patented Aug. 19, 1890.
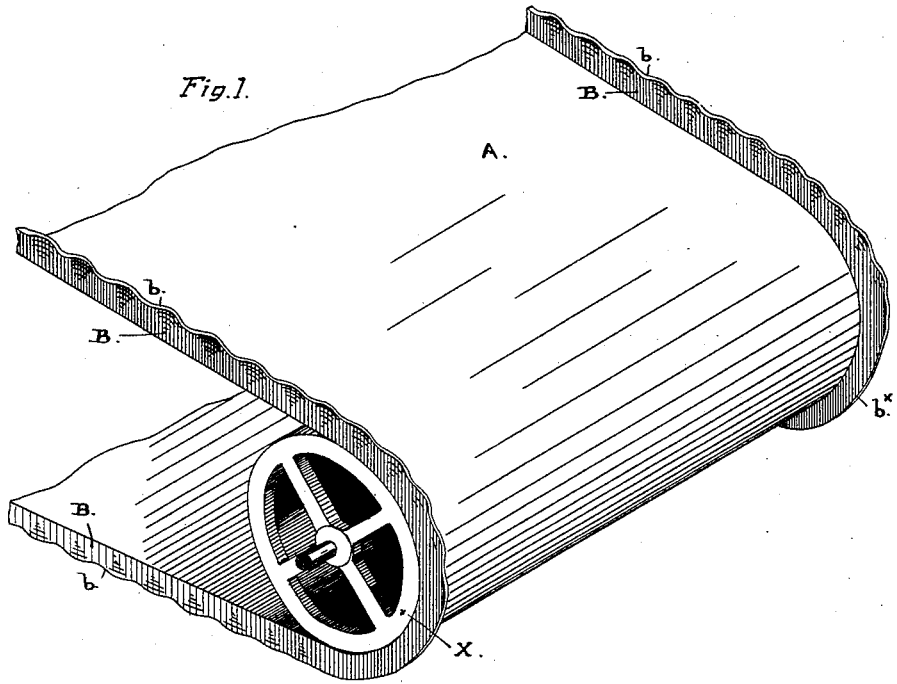
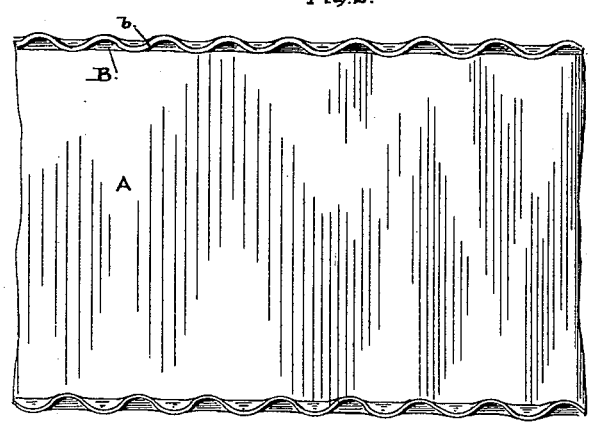
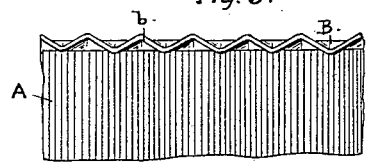
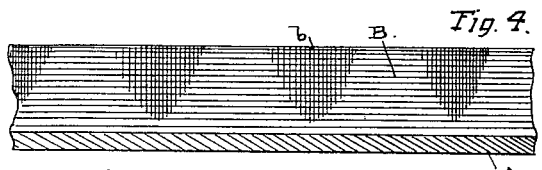
Witnesses:
Edward C. Osborn
Isaac A. Woodbury
Inventor:
George E. Woodbury.

UNITED STATES PATENT OFFICE.

GEORGE E. WOODBURY, OF SAN FRANCISCO, CALIFORNIA.

BELT OR APRON FOR ORE-CONCENTRATORS.

SPECIFICATION forming part of Letters Patent No. 434,693, dated August 19, 1890.

Application filed March 7, 1890. Serial No. 342,958. (No model.)

*To all whom it may concern:*

Be it known that I, GEORGE E. WOODBURY, a citizen of the United States, residing in the city and county of San Francisco and State of California, have invented certain new and useful Improvements in Belts or Aprons for Ore-Concentrators, of which the following is a specification.

My invention relates to an improvement in endless belts or aprons having raised or standing sides, such as are used in certain classes of ore-concentrating machines; and it has for its object to produce a raised side or standing edge that will not break down or split or otherwise be injured in running over the drums or rollers around which these aprons are carried in their endless travel.

Referring to the accompanying drawings that forms part of this specification, Figure 1 represents a view in perspective of a portion of an endless traveling concentrator-belt at one of its ends where it turns over the end roller, the raised sides of the belt being constructed according to my invention. Fig. 2 is a top view or plan of a portion of the belt. Fig. 3 is a transverse section through one standing edge and a part of the bottom. Fig. 4 is a longitudinal section through the body on a line parallel with the standing edge. Fig. 5 shows the expanding edge produced in another form.

In carrying out my invention I form the standing side or rim on a belt or endless traveling apron with a corrugated or fluted or plaited top portion, producing an excess in length of the material, particularly along the top, over the length of the belt or of the lower part of the standing rim where it joins the belt. The folds or corrugations or plaits should be made of such length or size that they furnish the additional length required at the top edge of the standing rim when the belt is turned from a straight line into a curved or circular line, as in passing around the end rollers of the machine, and such addition in length depends on and is to be determined by the size of the roller, and also to some extent by the height of the standing side as its top edge lies in a greater circle than the bottom or the line of junction with the belt, and consequently increases in length with the height of the standing edge above the surface of the belt. At the present time these endless traveling belts are made of rubber or rubber cloth, and the raised sides are usually formed of rubber strips having somewhat greater elastic quality than the body of the belt, in order to stretch along the top edges, the sides being molded onto or formed with the body of the belt in various ways. By any of the modes of manufacture now employed this expanding edge can readily be made in either of the forms which are herein shown and described, or in such other equivalent form that will secure the desired end and object.

The height of the standing edge and the amount of stretch it undergoes along the top are to be considered in determining of what size and depth the forms or corrugations should be made; but as these folds or corrugations do not affect the functions of the standing edge, but on the contrary act to stiffen it or preserve its upright position, there need be observed no exact proportion of size of corrugations to the height of the standing side being formed. The essential point in its production is to provide sufficient excess of material at and along the top edge to supply the additional length that the edge would be stretched if its elasticity alone were relied on. In practice the edge standing about three-fourths of an inch above the face of the belt will be required to stretch about one and one-half inches on the top line in every foot of its length on a drum or roller of sixteen inches in diameter.

The corrugations in that form of standing edge represented in Fig. 1 to 4, inclusive, are of uniform curvature disposed equally on both sides of the longitudinal center line, and diminishing in depth toward the bottom, at which point they merge into the flat portion to leave the lowermost portion of the face, and particularly the inner face, of the raised side where it joins the flat surface of the belt smooth or without indentations.

Fig. 5 represents an edge of straight folds with sharp turns or angles.

In the drawings, A indicates the body of the belt, B B the standing sides, and $b$ the extensible edge on the standing side.

Letter $x$ indicates the drum or roller around which the belt is carried, and $b^*$ illustrates the form assumed by the standing edge when expanded or extended on the roller.

Having thus fully described my invention, what I claim, and desire to secure by Letters Patent, is—

1. A concentrator-belt or endless traveling apron having raised or standing sides the edges of which are fluted or corrugated at right angles to the surface of the belt to form an expanding top edge, substantially as herein described.

2. A raised or standing side for endless traveling belts or aprons having an excess in length of the material along the top edge, which is disposed in folds or corrugations at right angles to the surface of the belt, forming an extensible standing edge, for operation as set forth.

In testimony that I claim the foregoing I have hereunto set my hand and seal.

GEORGE E. WOODBURY. [L. S.]

Witnesses:
EDWARD C. OSBORN,
JAMES A. WOODBURY.